United States Patent
Mirochnitchenko et al.

(10) Patent No.: US 6,588,202 B1
(45) Date of Patent: Jul. 8, 2003

(54) INTERNAL COMBUSTION ENGINE, AND VEHICLE PROVIDED THEREWITH

(76) Inventors: Fedor Mirochnitchenko, 425 42nd St., Brooklyn, NY (US) 11232-3509; Shiomohai Niyazov, 1255 44th St., Brooklyn, NY (US) 11219

( * ) Notice: Subject to any disclaimer, the term of this patent is extended or adjusted under 35 U.S.C. 154(b) by 0 days.

(21) Appl. No.: 09/649,807

(22) Filed: Aug. 28, 2000

Related U.S. Application Data

(63) Continuation-in-part of application No. 09/276,114, filed on Mar. 25, 1999, now Pat. No. 6,109,023.

(51) Int. Cl.[7] ................................................. F01N 3/28
(52) U.S. Cl. .......................... 60/286; 60/289; 60/301; 60/303; 60/311
(58) Field of Search ........................... 123/567, 568.11, 123/568.12, 568.15; 60/274, 278, 279, 289, 290, 293, 299, 301, 302, 303, 304, 306, 307, 386, 311

(56) References Cited

U.S. PATENT DOCUMENTS

| | | | | |
|---|---|---|---|---|
| 1,992,265 A | * | 2/1935 | Weeks | 123/568.15 |
| 2,954,967 A | * | 10/1960 | Johnson | 123/568.15 |
| 3,702,110 A | * | 11/1972 | Hoffman et al. | 123/568.12 |
| 3,851,470 A | * | 12/1974 | Kaufmann, Jr. | 60/307 |
| 3,906,725 A | * | 9/1975 | Addoms et al. | 60/307 |
| 4,015,429 A | * | 4/1977 | Pichl | 60/307 |
| 4,587,807 A | * | 5/1986 | Suzuki | 60/278 |
| 4,674,463 A | * | 6/1987 | Duckworth et al. | 60/320 |
| 4,984,426 A | * | 1/1991 | Santi | 123/567 |
| 5,016,599 A | * | 5/1991 | Jubb | 123/568.12 |
| 5,284,016 A | * | 2/1994 | Stark et al. | 60/303 |
| 5,452,577 A | * | 9/1995 | Langer | 60/302 |
| 5,590,523 A | * | 1/1997 | Fox | 60/307 |
| 5,692,373 A | * | 12/1997 | Atmur et al. | 60/302 |
| 5,761,903 A | * | 6/1998 | Straka | 123/567 |
| 6,109,023 A | * | 8/2000 | Mirochnitchenko et al. | 60/303 |
| 6,164,066 A | * | 12/2000 | Sakaguchi et al. | 60/307 |

* cited by examiner

Primary Examiner—Willis R. Wolfe
(74) Attorney, Agent, or Firm—I. Zborovsky

(57) ABSTRACT

An internal combustion engine has an engine part for providing a movement, the engine part having an outlet for discharging exhaust gasses from the engine part, and an exhaust gas system including an exhaust gas conduit having an inlet which is connected with the outlet of the internal combustion engine so as to receive discharged exhaust gasses from the internal combustion engine and an outlet which is open, and an additional internal combustion chamber which is directly connected with the outlet of the internal combustion engine and receives exhaust gasses from the internal combustion engine and also receives an air-oxygen mixture from outside without fuel for combustion of the exhaust gasses and introduces the air-oxygen mixture without fuel into the exhaust system so as to provide combustion of the exhaust gasses.

8 Claims, 2 Drawing Sheets

INTERNAL COMBUSTION ENGINE, AND VEHICLE PROVIDED THEREWITH

CROSS REFERENCE TO A RELATED APPLICATION

This application is a continuation-in-part of application Ser. No. 09/276,114 filed on Mar. 25, 1999 now U.S. Pat. No. 6,109,023.

The present invention relates to an internal combustion engine and a vehicle provided with such an internal combustion engine, with means for cleaning exhaust gasses.

All vehicles with internal combustion engines have a discharge through which exhaust gasses are discharged in the atmosphere. Numerous attempts have been made to clean discharge gasses so as to emit as little as possible of polluting substances. It is believed that additional improvement of this process is desirable.

SUMMARY OF THE INVENTION

Accordingly, it is an object of present invention to provide an internal combustion engine and a vehicle which is equipped with such an internal combustion engine which avoids the disadvantages of the prior art.

In keeping with these objects and with others which will become apparent hereinafter, one feature of present invention resides, briefly stated, in an internal combustion engine which has an engine part for providing a movement, said engine part having an outlet for discharging exhaust gasses from said engine part; and an exhaust gas system including an exhaust gas conduit having an inlet which is connected with said outlet of said internal combustion engine so as to receive discharged exhaust gasses from said internal combustion engine and an outlet which is open, and an additional internal combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses.

In accordance with another feature of present invention, a vehicle is provided, which has a vehicle part to be movable on a road; and an internal combustion engine mounted on said vehicle for driving said vehicle for movement on the road, said internal combustion engine including an engine part for providing a movement, said engine part having an outlet for discharging exhaust gasses from said engine part, and an exhaust gas system including an exhaust gas conduit having an inlet which is connected with said outlet of said internal combustion engine so as to receive discharged exhaust gasses from said internal combustion engine and an outlet which is open, and an additional internal combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses.

When the internal combustion engine and the vehicle is designed in accordance with the present invention, it substantially increases cleaning of exhaust gasses, so that the exhaust gasses emitted into atmosphere have minimal or substantially no impurities at all.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
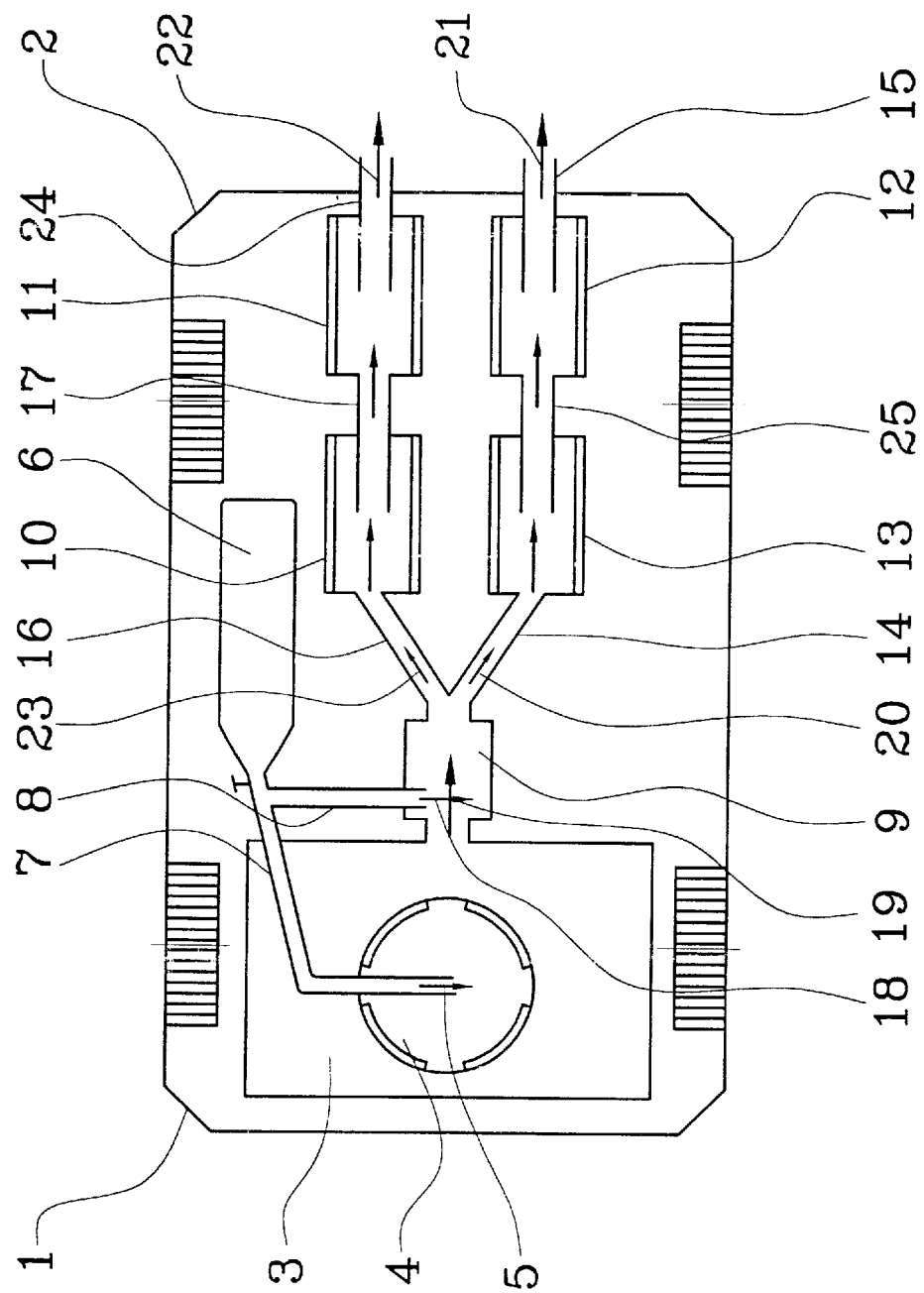
FIG. 1 is a view schematically showing a vehicle with an internal combustion engine in accordance with the present invention.

As shown in FIG. 1, a vehicle, for example an automobile, has a front part identified with reference numeral 1 and rear part identified with reference numeral 2. An internal combustion engine 3 drives the vehicle, for example it operates rear wheels of the vehicle. The internal combustion engine 3 is provided with a filter 4. The interior of a filter housing is covered with tiles of ceramics with a layer of titanium oxide.

The exhaust system includes two pipe trains including pipes 14, 15, 25 and pipes 16, 17, 24 correspondingly. The pipe trains have outlets which are open into atmosphere. A chamber 9 is provided for additional burning of exhaust products from the internal combustion engine, such as gasoline, diesel fuel, gas, etc., which has not been completely burned in the cylinders of the internal combustion engine. It has an inlet communicating with an outlet of the engine part or the cylinders and an outlet connected with the pipe trains. A vessel for a mixture of oxygen and air is identified with reference numeral 6. It has a pipe 7 for supplying the air oxygen mixture into the engine part or in other words into the cylinders of the internal combustion engine, in direction of the arrow 5, and a pipe 8 for supplying the oxygen-air mixture into the additional chamber 9. A preferable ratio of the mixture is 88% of oxygen and 12% of air. The oxygen-air mixture is introduced into the chamber 9 in direction of the arrow 8, in particular into a flame 9 which exits the engine part, in its very center.

A plurality of additional vessels are provided in the exhaust system, including vessels 10 and 11 in one pipe train and vessels 12 and 13 in another pipe train. The inner walls of the vessels 10–13 are covered with ceramic tiles with a layer of titanium oxide. Arrows 20, 21, 22, and 23 illustrate directions of movement of exhaust gasses after they have been purified in the inventive exhaust system, then emitted into atmosphere.

In the inventive exhaust system, the exhaust flame from the engine part or in other words from the cylinders of the internal combustion engine is mixed at the point 18 with the mixture of oxygen and air in order to continue the combustion which started in the cylinders of the internal combustion engine, in the chamber 9 to provide a complete combustion of the fuel until it is harmless for the environment. It is not necessary to introduce an additional fuel, such as gasoline, etc., into a chamber 9 and it is also not necessary to have an additional igniting element in the chamber 9. The layer of the titanium oxide in the subsequent vessels is an additional purifying structure for the exhaust gasses, which additionally purifies the exhaust gasses from impurities.

Figure 2:
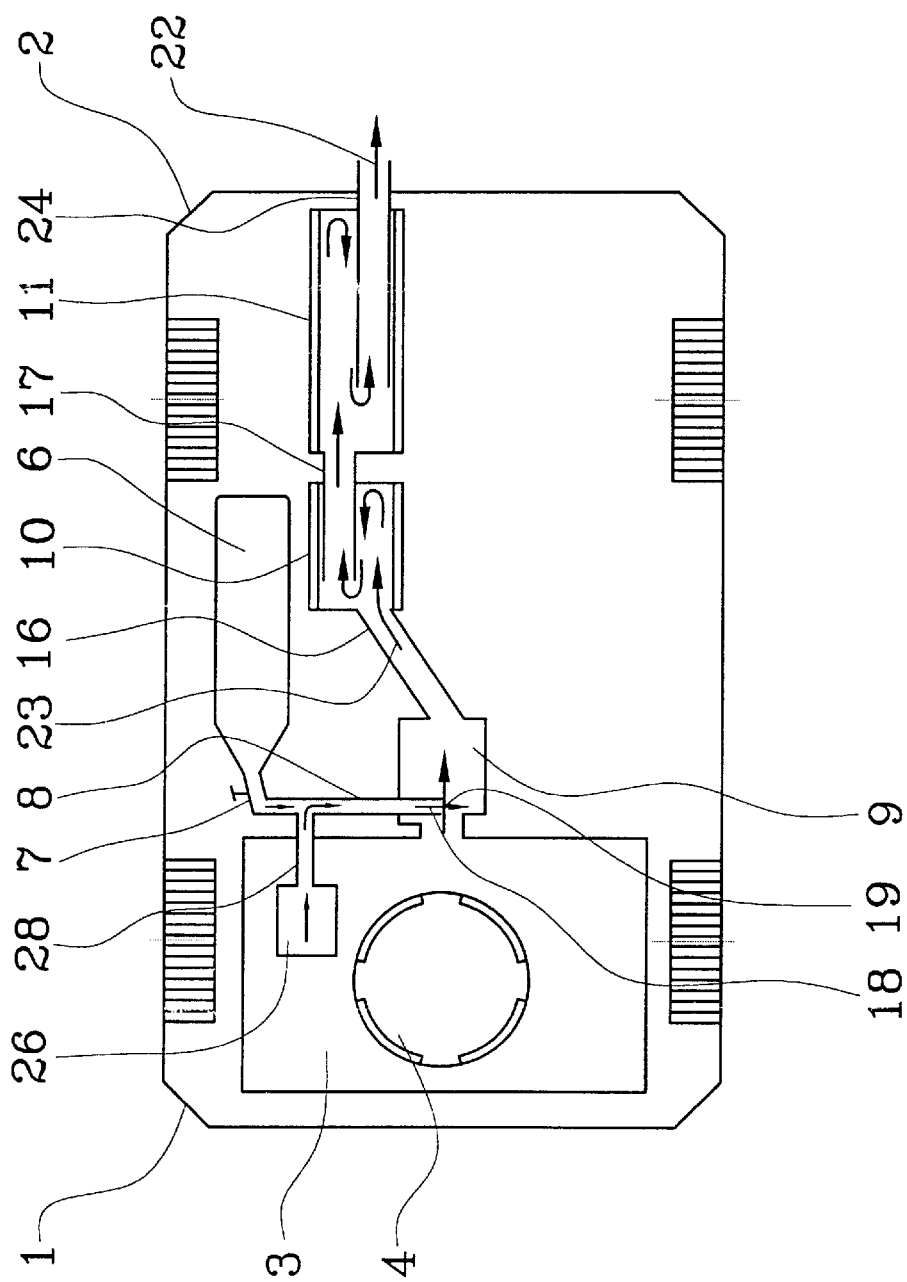
FIG. 2 is a view substantially corresponding to the view of FIG. 1 but showing another embodiment of the present invention.

The second embodiment of the present invention which is shown in FIG. 2 substantially corresponds to the embodiment of FIG. 1. In this embodiment, however, only one pipe train is provided. In addition, the internal combustion engine is provided with a turbo injection member or pump 26. In the inventive internal combustion engine the oxygen-air mixture is introduced into the additional chamber 9 from the oxygen-air container 6, directly into a flame which emerges from the engine part or from the cylinders of the internal combustion engine. The turbo pump 26 introduces the oxygen-air mixture through a pipe 28 also into the chamber 9. This additionally guarantees a complete combustion of the exhaust gasses and its purifications from impurities.

It will be understood that each of the elements described above, or two or more together, may also find a useful application in other types of constructions differing from the types described above.

While the invention has been illustrated and described as embodied in internal combustion engine, and vehicle provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An internal combustion engine, comprising an engine part for providing a movement, said engine part having an outlet for discharging exhaust gasses from said engine part; and an exhaust gas system including an exhaust gas conduit having an inlet which is connected with said outlet of said internal combustion engine so as to receive discharged exhaust gasses from said internal combustion engine and an outlet which is open, and an additional internal combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses, said exhaust gas system including a plurality of additional vessels covered inside with ceramic tiles and a layer of titanium oxide and arranged so that a first one of said vessels is connected with said additional chamber and subsequent ones of said vessels are connected with one another so that the layer of titanium oxide absorbs impurities from exhaust gasses exiting said additional vessel; an air filter connected with an outlet of at least one of said vessels and coated from inside with ceramic tiles with a layer of titanium oxide so as to filter the exhaust gasses received in said air filter from said vessels from combustion products and to additionally absorb residues of exhaust gas impurities, said air filter having an outlet connected with said engine part.

2. An internal combustion engine as defined in claim 1; and further comprising an air-oxygen containing vessel, a first conduit portion introducing the air-oxygen mixture from said vessel into said internal combustion engine directly and a second conduit portion introducing a part of said air-oxygen mixture from said vessel into said additional chamber.

3. An internal combustion engine as defined in claim 1, wherein said exhaust gas system includes a plurality of additional vessels covered inside with ceramic tiles and a layer of titanium oxide and arranged so that a first one of said vessels is connected with said additional chamber and subsequent ones of said vessels are connected with one another so that the layer of titanium oxide absorbs impurities from exhaust gasses exiting said additional vessel.

4. An internal combustion engine as defined in claim 1; and further comprising means for turbo-injection of the air oxygen mixture into said additional chamber.

5. A vehicle, comprising a vehicle part movable on a road; and an internal combustion engine mounted on said vehicle for driving said vehicle for movement on the road, said internal combustion engine including an engine part for providing a movement, said engine part having an outlet for discharging exhaust gasses from said engine part, and an exhaust gas system including an exhaust gas conduit having an inlet which is connected with said outlet of said internal combustion engine so as to receive discharged exhaust gasses from said internal combustion engine and an outlet which is open, and an additional internal combustion chamber which is directly connected with said outlet of said internal combustion engine and receives exhaust gasses from said internal combustion engine and also receives an air-oxygen mixture from outside without fuel for combustion of the exhaust gasses and introduces the air-oxygen mixture without fuel into said exhaust system so as to provide combustion of the exhaust gasses, exhaust gas system including a plurality of additional vessels covered inside with ceramic tiles and a layer of titanium oxide and arranged so that a first one of said vessels is connected with said additional chamber and subsequent ones of said vessels are connected with one another so that the layer of titanium oxide absorbs exhaust gasses exiting said additional vessel; and an air filter connected with an outlet of at least one of said vessels and coated from inside with ceramic tiles with a layer of titanium oxide so as to filter the exhaust gasses received in said air filter from said vessels from combustion products and to additionally absorb residuals of exhaust gas impurities, said air filter having an outlet connected with said engine part.

6. A vehicle as defined in claim 5; and further comprising an air-oxygen containing vessel, a first conduit portion introducing the air-oxygen mixture from said vessel into said internal combustion engine directly and a second conduit portion introducing a part of said air-oxygen mixture from said vessel into said additional chamber.

7. A vehicle as defined in claim 5; wherein said exhaust gas system includes a plurality of additional vessels covered inside with ceramic tiles and a layer of titanium oxide and arranged so that a first one of said vessels is connected with said additional chamber and subsequent ones of said vessels are connected with one another so that the layer of titanium oxide absorbs exhaust gasses exiting said additional vessel.

8. A vehicle as defined in claim 5; and further comprising means for turbo-injection of the air oxygen mixture into said additional chamber.

* * * * *